(12) United States Patent
Ogle et al.

(10) Patent No.: US 10,929,520 B2
(45) Date of Patent: Feb. 23, 2021

(54) SECURE READ-ONLY CONNECTION TO PERIPHERAL DEVICE

(71) Applicant: Dell Products L.P., Round Rock, TX (US)

(72) Inventors: Scott Talmadge Ogle, Round Rock, TX (US); Ricardo L. Martinez, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 239 days.

(21) Appl. No.: 15/610,377

(22) Filed: May 31, 2017

(65) Prior Publication Data

US 2018/0351744 A1    Dec. 6, 2018

(51) Int. Cl.
  *G06F 21/34* (2013.01)
  *H04W 12/12* (2021.01)
  *H04L 29/06* (2006.01)
  *H04L 9/32* (2006.01)

(52) U.S. Cl.
  CPC .............. *G06F 21/34* (2013.01); *H04L 63/08* (2013.01); *H04L 63/1416* (2013.01); *H04L 63/18* (2013.01); *H04W 12/1206* (2019.01); *H04L 9/3242* (2013.01); *H04L 9/3247* (2013.01)

(58) Field of Classification Search
  CPC ... H04L 63/0428; H04L 63/126; H04L 63/20; H04L 9/0891; H04L 9/3263; H04L 63/062
  See application file for complete search history.

(56) References Cited

U.S. PATENT DOCUMENTS

| 9,720,700 | B1 * | 8/2017 | Brown | .................. H04L 9/0891 |
| 2006/0070123 | A1 * | 3/2006 | Camilli | .................. G06F 21/79 726/16 |
| 2016/0378971 | A1 * | 12/2016 | Dunstan | .................. G06F 21/44 726/17 |
| 2017/0091060 | A1 * | 3/2017 | Vadivelu | ............... G06F 11/221 |

* cited by examiner

*Primary Examiner* — Hsiungfei Peng
*Assistant Examiner* — Fred Peng
(74) *Attorney, Agent, or Firm* — Norton Rose Fulbright US LLP

(57) ABSTRACT

Information handling systems may be equipped with interfaces to facilitate connection with peripheral devices to serve a variety of functions. A peripheral device may be configured with read-only configuration data when coupled to an information handling system, and the peripheral device allowed to operate in read-only mode. The configuration data may be transmitted as configuration channel (CC) sideband of the interface, such as a USB Type-C interface. If the peripheral device cannot be configured in read-only mode, the information handling system may prevent access to the peripheral device to maintain security policies and prevent data leakage.

13 Claims, 5 Drawing Sheets

SECURE READ-ONLY CONNECTION TO PERIPHERAL DEVICE

FIELD OF THE DISCLOSURE

The instant disclosure relates to information security of information handling systems. More specifically, portions of this disclosure relate to establishing secure connections between information handling systems and peripheral devices.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Functionality of information handling systems may be expanded through use of external peripheral devices. Such devices may be connected to information handling systems through interfaces allowing for communication between the information handling system and the device. For example, many information handling systems are designed to interact with peripheral devices to access and store information on the peripheral devices. Using peripheral devices, users of information handling systems can transfer information from one system to another with ease. For example, a user may transfer information from a first information handling system to a peripheral device and then from the peripheral device to a second information handling system. However, allowing users to transfer information from information handling systems to peripheral devices may increase the risk of security breaches, as information may be illicitly copied from an information handling system to a peripheral device. For example, files intended to be securely stored exclusively on an information handling system may be copied to an external device and then distributed without the permission of the entity controlling the information handling system.

Shortcomings mentioned here are only representative and are included simply to highlight that a need exists for improved security of information handling systems, particularly for secure devices employed in conjunction with information handling systems, such as data centers and personal computing devices. Embodiments described herein address certain shortcomings but not necessarily each and every one described here or known in the art. Furthermore, embodiments described herein may present other benefits than, and be used in other applications than, those of the shortcomings described above.

SUMMARY

Many users of information handling systems use peripheral devices, such as flash memory drives, external hard drives, or external CD/DVD-ROM drives, to transfer information between one information handling system and another or to create backup copies of data stored on an information handling system. However, allowing transfer of information between information handling systems and peripheral devices can create opportunities for security breaches. For example, unauthorized users may illicitly copy files from information handling systems to peripheral devices. To prevent security breaches, such as illicit copying, entities controlling information handling systems may disable peripheral device functionality of information handling systems entirely. However, disabling peripheral functionality entirely prevents transfer of files from peripheral devices to information handling systems as well, thus limiting device functionality more than necessary. Information handling systems may be configured to allow transferring of information from a peripheral device to the information handling system (e.g., read-only or one-way communication) but not from the information handling system to the peripheral device. Security measures may be implemented in the peripheral device and the information handling system to ensure that transfers between the device and the system are restricted to such one-way communication or otherwise prevent certain information from being transferred off the information handling system.

An information handling system may include an interface for peripheral devices and a controller connected to the interface. To enhance security of information stored on an information handling system, the controller may be configured to prevent the information handling system from connecting to devices that are not secure by determining whether the device is a secure device. The interface may be, for example, a Universal Serial Bus (USB) Type-C interface. Configuring the interface to operate in the read-only mode may include configuring the interface to operate in a Type-C Alternate Mode configured to prevent data from being written from the information handling system to the device via the interface. The controller may be further configured to operate the interface in the Type-C Alternate mode while the information handling system is connected to the device. When an insecure device is coupled to the interface, the controller may prevent the connection to the peripheral device, such as by physically disconnecting the interface or preventing transmission of data from the interface to a system bus of the information handling system.

In determining whether the device is a secure device, the controller may determine whether the device supports a configuration to operate in the read-only mode. For example, the controller may determine whether the device supports operation in the read-only Type-C Alternate Mode when the interface is a USB Type-C interface. Thus, the controller may determine whether the information handling system is capable of forming a secure connection with the device before connecting the information handling system to the device. The controller may request and receive an authentication parameter from the device via a configuration channel (CC) sideband of the interface. The controller may then verify that the authentication parameter indicates that the device meets a predetermined security level. A Basic Input/

Output System (BIOS) of the information handling system may perform the step of verifying by comparing a security level of the device indicated by the authentication parameter with a predetermined security level specified by the BIOS. For example, the BIOS may verify that the device conforms with a security policy specified in the BIOS. After verifying that the device is a secure device, the controller may configure the device to operate in the read-only mode via the CC sideband of the interface.

If the device is a secure device, the controller may connect the information handling system to the device in a read-only mode. The read-only mode may allow the information handling system to read data from the device via the interface but prevents data, apart from non-user data, such as connection management data, device configuration data, and/or other signaling control data, from being written to the device. Configuration data may be written to the device to place the device in the read-only mode. Signaling control data may be used to, for example, specify files and/or data blocks to be read and transferred to the information handling system. Signaling control data may also include a health status and/or other non-user data information regarding the peripheral device, such as a model number, serial number, firmware version, and the like. Connection management data may be used to initialize and manage a connection between an information handling system and a peripheral device. Connection management data may include device configuration data and other data relevant to establishing a connection between two devices. Connecting the information handling system to the device in the read-only mode may include configuring both the system interface and the connected device to operate in the read-only mode. Placing both the system interface and the connected device in the read-only mode can allow both elements to work together to protect information stored on the information handling system by preventing information from being written to the device via the interface. Configuring the system interface and the device to operate in the read-only mode may include configuring the interface to operate in a Type-C Alternate Mode configured to prevent data from being written from the information handling system to the device via the interface. The controller may be further configured to operate the system interface in the Type-C Alternate mode while the information handling system is connected to the device.

If the device is not a secure device, e.g., not capable of being configured to operate in the read-only mode and/or failing to meet a predetermined security level, the controller may prevent the information handling system from transmitting data to and receiving data from the device via the interface. For example, the controller may power down the interface so that no further communication between the device and the interface may occur. The controller may also display a message to a user of the information handling system informing the user that the device is not a secure device.

A secure device for connecting to an information handling system may include an interface and a controller coupled to the interface. The controller may be configured to operate the device in a read-only mode upon receipt of configuration data instructing the device to operate in the read-only mode from an information handling system that limits connection to read-only devices. The controller may be further configured to operate the device in a read-write mode when no configuration data instructing the device to operate in the read-only mode is received. The read-only mode may allow the information handling system to read data from the device but prevent data, other than certain non-user data, from being written to the device. The read-write mode may allow the information handling system to freely read data from and write data to the device. The controller may also be configured to receive configuration data from the information handling system via a CC sideband of the interface to configure the device to operate in the read-only mode, when the device is connected to an information handling system that limits connection to read-only devices. The device may include a storage medium, such as a DVD-ROM drive, coupled to the controller. The read-only mode may allow data to be read from the storage while preventing data from being written to the storage medium.

A method for performing the steps of detecting, determining, connecting, and preventing, similar to the steps performed by the controller described herein, may be used to control a connection between an information handling system and a device. Such a method may be performed by an information handling system or by a component of an information handling system such as a controller or processor.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Information handling systems may be equipped with interfaces to facilitate connection with peripheral devices without risking leakage of confidential or protected data on the information handling system.

Figure 1:
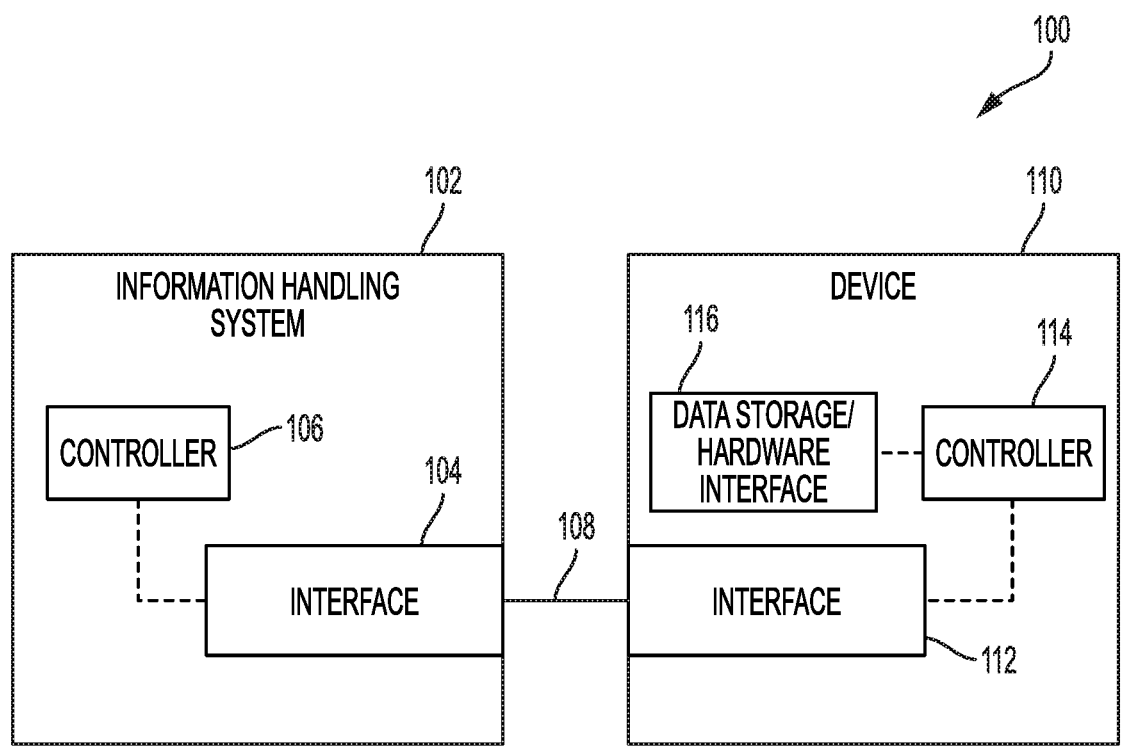
FIG. 1 is a block diagram illustrating an information handling system and a device according to some embodiments of the disclosure.

One technique for reducing security risks introduced by peripheral functionality is to prevent the information handling system from connecting to untrusted devices. These trusted devices may be used in a read-only mode to prevent writing data to connected devices while allowing the information handling system to read data from connected devices. An information handling system 102 coupled to a device 110 is illustrated in FIG. 1. The device 110 may be, for example, a flash memory stick, a second information handling system, a DVD-ROM drive, a CD-ROM drive, a Blu-ray drive, a multi-media reader for SD, Micro-SD, XD, and Compact Flash cards and the like, an external hard drive disk, an external hard drive disk dock, an external solid state drive, a floppy disk drive, a cable dock, or a network interface adaptor. The device 110 may be powered through an interface with the information handling system 102 and designed to meet a power threshold of the information handling system, such as 7.5 Watts or less. The device 110 may transfer information with the information handling system 102 at data transfer speeds sufficient for reading of information from an 8× DVD-ROM or 24× CD-ROM, such as is possible through USB 3.0 interfaces communicating at 4.8 Gbps. The information handling system 102 may include an interface 104 and a controller 106. The interface 104 may be a USB type-C interface or other interface configurable to operate in a read-only mode, such as a USB type-A interface, a Thunderbolt interface, a eSATA interface. Although examples of wired interfaces are provided, the interface 104 need not be restricted to a wired interface and may include wireless interfaces for data transfer, such as Wi-Fi, Bluetooth, RFID, Zigbee, cellular, and the like. The controller 106 may control the interface 104 and a connection 108 between the interface 104 of the information handling system 102 and an interface 112 of the device 110. The information handling system 102 may provide power to and/or configure the device 110 via the connection 108.

The device 110 may contain a data storage medium 116. For example, the data storage medium 116 may be an interchangeable data storage medium such as a DVD, a CD, or a SD, Micro-SD, XD or Compact Flash card. The data storage medium 116 may be integrated into the device 110, such as flash memory of a flash memory stick or magnetic data storage of a hard drive disk. The data storage medium 116 may be external to the device 110 such as a server of a cloud data storage connected to the device 110 through a network. The device 110 may contain a controller 114 configured to control the interface 112 and the data storage medium 116. For example, the controller 114 may control what data is transmitted between the data storage medium 116 and the interface 112 and may also control an operating mode of the device 110 and/or the interface 112 of the device 110.

The controller 106 of the information handling system 102 may be configured to connect the device 110 to the information handling system 102 in a read-only mode, allowing the information handling system 102 to read information from the device 110 over the connection 108, while preventing the information handling system 102 from writing data to the device 110. The controller 106 may also be configured to prevent the information handling system 102 from allowing any device 110 that does not support operation in a read-only mode to connect via the interface 104. User data, such as driver downloads and system restores, may be copied from the device 110 to the information handling system 102 via connection 108.

To protect information stored thereon, information handling systems may be configured to prevent connection to peripheral devices that do not support operation in a read-only mode. A method 200 illustrated in FIG. 2 may begin, at step 202, with detection of a device coupled to an interface. For example, a device may be physically coupled to the interface of the information handling system prior to establishing a connection for the transmission of user data between the device and the information handling system. The device may be detected by a controller of the information handling system.

The detected device may, in addition to being physically coupled to the interface, be connected to the interface for transmission of non-user data to allow the information handling system to determine if the device is secure. For example, the detected device may be connected to the interface via a CC sideband to allow transmission of non-user data, but the information handling system may prevent formation of a connection for transmission of user data until the detected device is determined to be secure. The information handling system may then determine, at step 204, whether the detected device is a secure device. A secure device may be a device supporting configuration of the device to operate in a secure mode, such as a read only-mode. For example, a controller of an interface of a secure device may configure the interface, upon receipt of configuration data from a connected information handling system, to engage in secure, read-only, communication with an interface of the information handling system. In some embodiments, a secure device may be a device configured to receive configuration data over a control channel sideband of the interface to allow secure configuration of the device to operate in a read-only mode. In some embodiments, the information handling system may require that secure devices meet a security level or threshold set by the information handling system. In determining if a detected device is secure, the information handling system may engage in a handshake with the device to determine if the detected device can be trusted to implement the read-only mode and/or to authenticate the detected device. For example, a port controller of the information handling system may read authentication information from the secure device, such as a device ID, a key-slashed message authentication code (HMAC), or a hardware-protected private key. A system BIOS or an embedded controller of the information handling system may compare the authentication information with a predetermined security level or security policy of the information handling system to determine if the authentication information indicates that the device meets the predetermined security level.

A variety of authentication methods may be used to determine whether the device is a secure device. The information handling system may receive a device ID for the connected device and compare the device ID to a list of allowed device IDs. If the device ID matches an ID on the list, the device may be a secure device. Another method for determining if the device is a secure device is through use of HMAC authentication. With HMAC authentication, the information handling system may have a cryptographic key stored in a memory, such as a memory storing firmware associated with a port controller. If a device is a secure device, the device will possess a matching cryptographic key along with implementation of a hash algorithm for transmitting data between the device and the information handling system. A determination of whether the device is a secure device may also or alternatively be made using a public key authentication algorithm. A public key may be stored by the information handling system, such as in a memory storing firmware associated with a port controller, and a private key may be stored on the secure device. A connected device may be secure if it contains a private key related to the public key, falling within authentication parameters set by an authentication algorithm. Thunderbolt authentication may also or alternatively be used to determine if a device is a secure device. When Thunderbolt authentication is implemented, both the information handling system and the secure device must be configured to operate within Thunderbolt parameters as communication between the information handling system and secure device may be scrambled with obfuscated data. Combinations of methods may be used to authenticate a secure device, such as by initially checking a device ID and then performing HMAC authentication.

If the device is a secure device, the information handling system may connect, at step 206, to the device in a read-only mode. The read-only mode may be a mode in which the information handling system may read data from the device but data from the information handling system may not be written to the device. In some embodiments, where the interface is a USB Type-C interface, the read-only mode may be a Type-C Alternate Mode of interfaces of both the information handling system and the device. In the information handling system, a port controller, or embedded controller, may configure an interface of the information handling system to operate in the read-only mode, such as a Type-C Alternate Mode, and may transmit configuration data to the device. For example, the configuration data may instructed a port controller of the device to configure the interface of the device to operate in the read-only mode. The Type-C Alternate Mode may be configured to allow read-only operation of USB-C interfaces in a variety of formats such as Thunderbolt, display port (DP), or USB 3.0. When the interfaces of the device and the information handling system are configured to operate in the read-only mode, the information handling system may connect to the device and read information from the device.

If it is determined, at step 204, that the device is not a secure device, the information handling system may power down the interface at step 208. The information handling system may also display a message to a user on a display of the information handling system informing the user that the device is not a secure device and therefore the connection is not permitted. Thus, data transmission functionality of an interface of an information handling system may be configured to be disabled for all devices apart from select secure devices.

Figure 3:
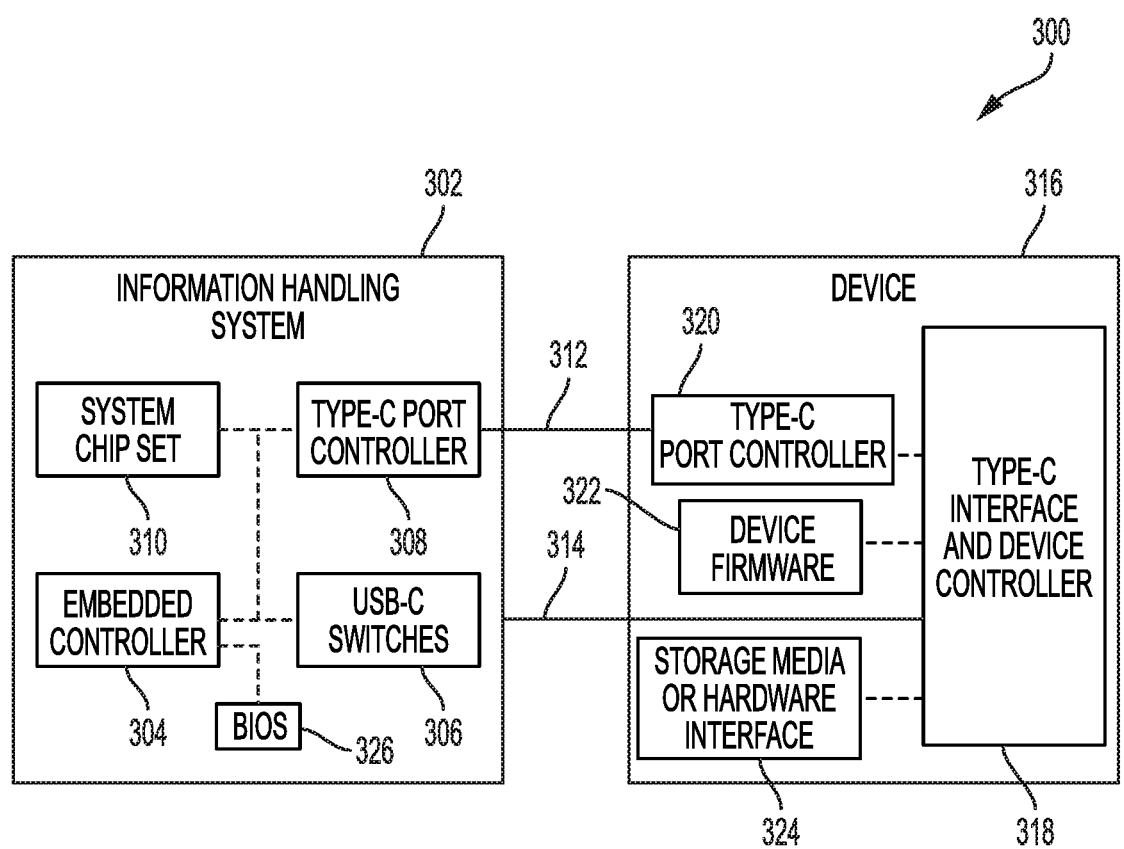
FIG. 3 is a block diagram illustrating an information handling system with a Type-C USB interface and a device according to some embodiments of the disclosure.

According to one embodiment of the disclosure, an information handling system may include a USB Type-C interface configured to connect only to secure devices having USB Type-C interfaces. FIG. 3 illustrates an example system 300 containing an information handling system 302 connected to a device 316. The information handling system 302 may contain a system chipset 310, an embedded controller 304 for controlling the interface, and an interface comprising a Type-C Port Controller 308, such as a PD controller operating on Type-C firmware and Type-C USB switches 306. The system chipset 310 may be connected to the Type-C port controller 308 via USB and/or general purpose input/output pins (GPIOs) and to the Type-C USB switches 306 via USB 3.0/3.1, a display port connection, or other communication interface. The system chipset 310 may also communicate with the embedded controller 304 via an embedded controller interface such as enhanced serial peripheral interface (eSPI), low pin count (LPC) interface, or other communications interface. The embedded controller 304 may contain embedded controller firmware and may be connected to the Type-C USB switches 306 via control GPIOS and to the port controller 308 via an interface such as a USB interface. The embedded controller 304 may be connected to a system BIOS 326, and the system BIOS 326 may contain a security policy detailing a required security level for connection of external devices. The embedded controller firmware of the embedded controller 304, the BIOS 326, and the Type-C firmware of the port controller 308 may be configured to support a read-only mode of the interface wherein devices supporting the read-only mode may be connected to in the read-only mode but connection to all other devices is prohibited.

An information handling system 302 that is coupled to a device 316 may be connected via connections 312 and 314 to facilitate transmission of user and non-user data between the two. The USB-C switches 306 may connect the information handling system 102 to the device 316 via Type-C data pins. The connection 314 between the USB-C switches 306 and the connected device 316 may allow the information handling system 302 to read data from the device 316. The port controller 308 may connect the information handling system 302 to the device 316 via a CC sideband 312. The CC sideband 312 may be used to transmit non-user data such as authentication and configuration data between the information handling system 302 and the device 316. For example, the port controller 308 of the information handling system 302 may read authentication information over the CC sideband 312 from a port controller 320 of the device 316 to determine whether the device is a secure device, for example whether the device is capable of being configured to operate in a read-only mode. The information handling system 302 may determine whether the device is a secure device by comparing, by the embedded controller 304, the authentication information received over the CC sideband 312 with a security level specified in the BIOS 326. If the device 316 is a secure device, the port controller 308 may transmit configuration data over the CC sideband 312 to configure the device 316 to operate in the read-only mode. For example, the port controller 308 may configure a Type-C interface and device controller 318 of the device 316 to operate the device 316 in the read-only mode, which, as discussed herein, may be a Type-C Alternate mode. After the device 316 and information handling system 302 have been configured to operate in the read-only mode, the data connection 314 may be initialized for the information handling system 302 to read information from the device 316. The connection may enable the information handling system 302 to read data from the device 316 via USB, and the embedded controller 304 may control the USB-C switches 306 and by extension the connection 314 via control GPIOs. Thus, configuration information may be written from the information handling system to the device over the CC sideband 312, but information may not be written to the device via the data connection 314. In an embodiment where the device 316 is a secure network adapter, network login and handshaking information may be transmitted over the CC sideband 312 to allow the secure network adaptor to connect to a network and provide the information handling system 302 with access to desired information. If authentication data from the device 316 fails to satisfy a security level set in the system BIOS 326 of the information handling system 302, the port controller 308 and USB-C switches 306 of the interface may be powered down to prevent connection to an unsecure device via data connection 314.

The Type-C interface and device controller 318 of the device 316 may operate the device in the read-only mode allowing the information handing system 302 to read data from a storage medium or hardware interface 324 of the device while preventing data from being written to the device 316 via the data connection 314. The Type-C interface and device controller 318 may be connected to the port controller 320 via a controller interface and to a device firmware 322 which may be stored on a device memory via a firmware interface. The device firmware 322 may allow the device to be configured to operate in a read-only mode, such as a Type-C Alternate Mode supporting only reading of data from the device 316 and not the writing of data to the device 316. The Type-C interface and device controller 318 may also be connected to a storage media or hardware interface 324 via a media control interface. The storage media or hardware interface may be a storage media internal to the device, such as a hard drive, a solid state drive, or a flash memory, or it may be an interface for reading or receiving information from a storage medium, such as a CD or DVD drive, a SD card reader, or a wireless network interface.

Figure 4:
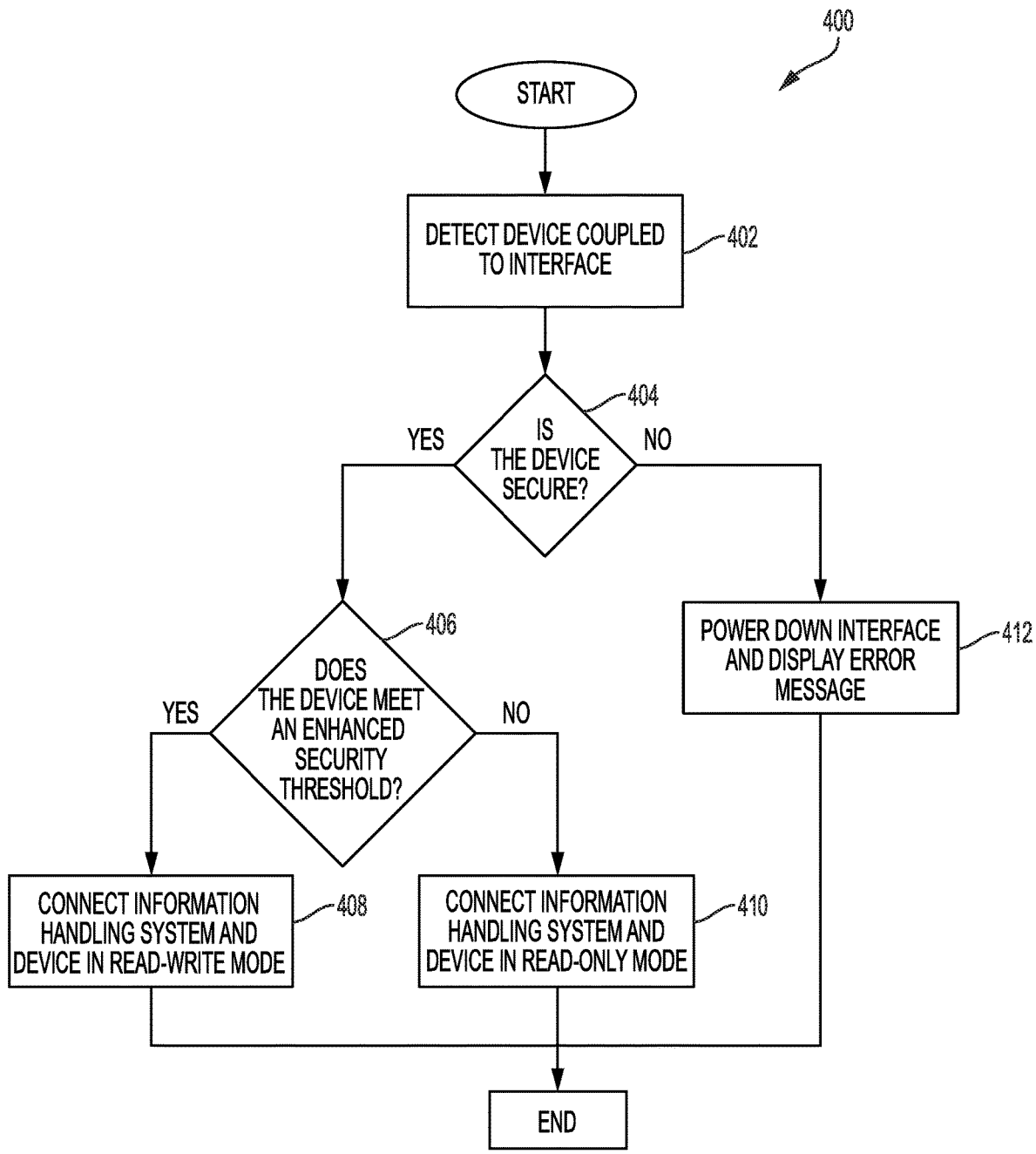
FIG. 4 is an illustration of an example method of controlling a connection between an information handling system and a device according to some embodiments of the disclosure.

Information handling systems may be configured to allow a read-write connection to secure devices that meet an enhanced security threshold. FIG. 4 illustrates an example method 400 for determining whether a device is a secure device and, subsequently, whether the secure device meets an enhanced security threshold. The information handling system may detect, at step 402, a device coupled to the interface. Then the information handling system may determine, at step 404, whether the device is secure, as described herein with respect to FIG. 2. If the device is not secure, the information handling system may, at step 412, power down the interface and display an error message. If the device is secure, the information handling system may then determine, at step 406, whether the device meets an enhanced security threshold. The enhanced security threshold may, for example, be a requirement that at least some information on the device be encrypted. If the device is secure but fails to meet the enhanced security threshold, the information handling system may connect to the device in a read-only mode, at step 410. If the device is secure and meets the enhanced security threshold, the information handling system may connect to the device in a read-write mode to allow user data to be written from the information handling system to the device and from the device to the information handling system.

Figure 5:
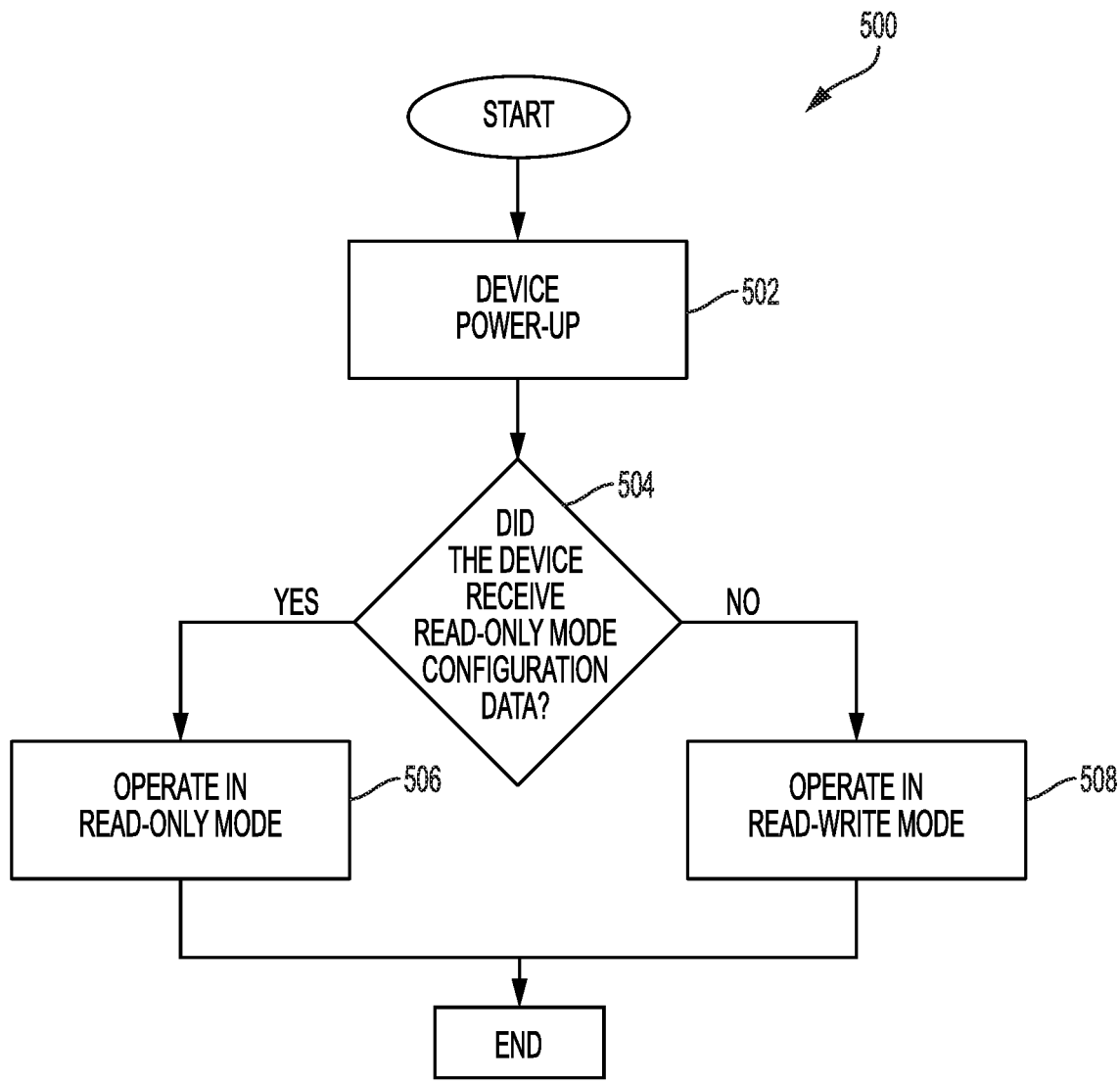
FIG. 5 is an illustration of an example method of selecting a secure device operating mode and operating the device in the selected mode.

A secure device may be configured to be compatible with both information handling systems restricting connection to only secure devices and information handling systems that allow connection to a variety of devices regardless of whether the device is secure or not. For example, a secure device may be configured to operate in a read-write mode by default, activating a read-only mode only if read-only mode configuration data is received from an information handling system. A method 500 for selecting a secure device operation mode and operating the device in the selected mode is illustrated in FIG. 5. At step 502, the secure device may receive power and begin operation. The device may operate in a read-write mode by default. At step 504, a determination may be made of whether the device has received read-only mode configuration data. The read-only mode configuration data may be received from an information handling system. If the device has received read-only mode configuration data, the device may operate in the read-only mode, at step 506, allowing data to be read from the device by an information handling system but preventing user data from being written to the device. If the device has not received read-only mode configuration data, the device may operate in the read-write mode, at step 508, allowing data to be read from and written to the device by the information handling system.

Figure 2:
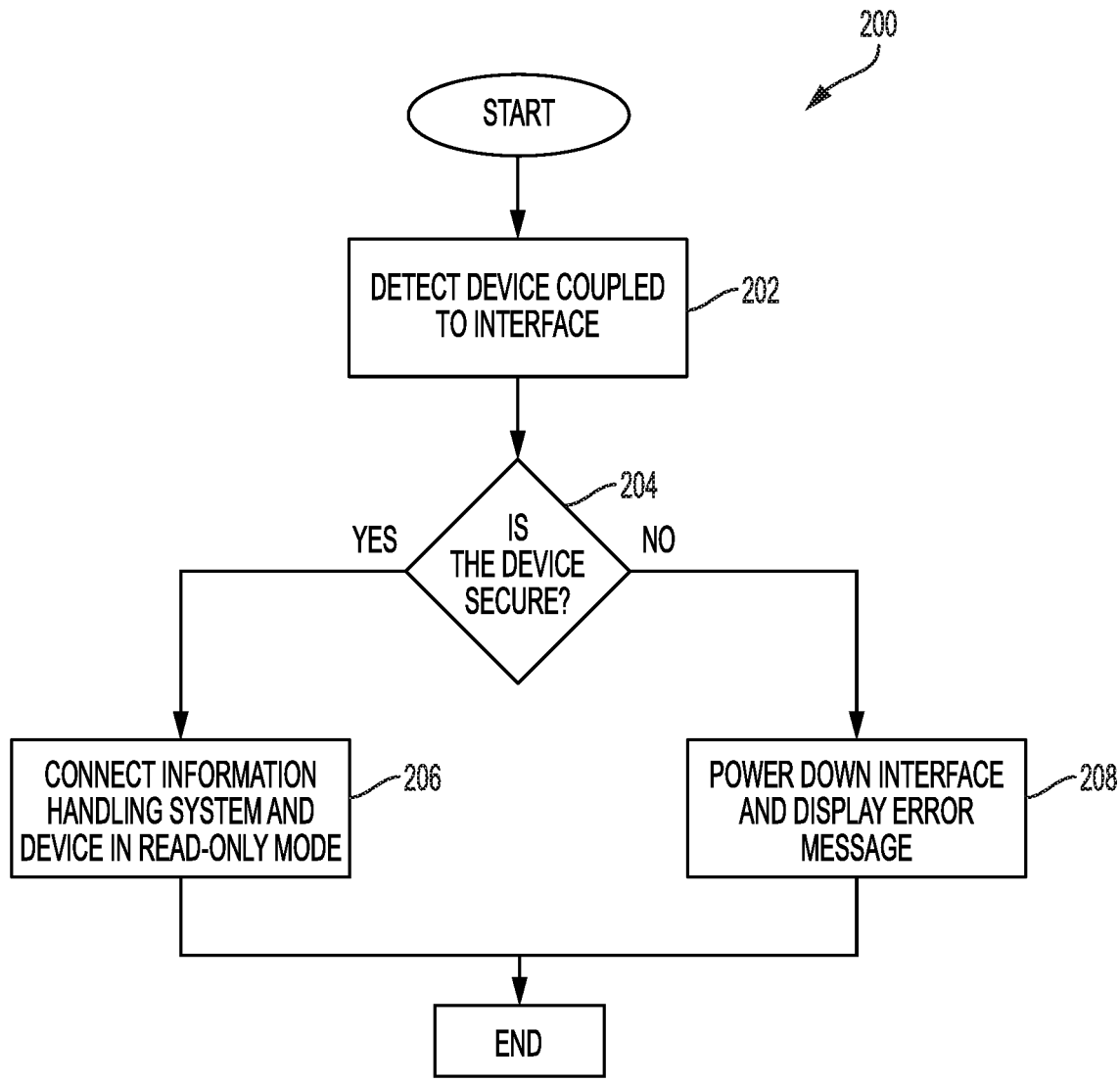
FIG. 2 is an illustration of an example method of controlling a connection between an information handling system and a device according to some embodiments of the disclosure.

The schematic flow chart diagrams of FIGS. 2 and 4-5 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An information handling system comprising:
   an interface; and
   a controller coupled to the interface, wherein the controller is configured to perform steps comprising:
   determining whether a device coupled to the interface supports configuration to operate in a read-only mode;
   if the device is determined to support a configuration to operate in a read-only mode, connecting the information handling system to the device in the read-only mode, wherein connecting comprises configuring both the interface and the device to operate in the read-only mode, and wherein the read-only mode allows the information handling system to read data from the device via the interface but prevents data, apart from non-user data, from being written to the device;
   determining whether a device coupled to the interface meet a predetermined security level, wherein the predetermined security level is specified in a Basic Input/Output System (BIOS) and determining comprises verifying an authentication parameter;
   if the device is determined to support a configuration to operate in a read-only mode and meet the predetermined security level, connecting the information handling system to the device in the read-write mode, wherein connecting comprises configuring both the interface and the device to operate in the read-write mode, and wherein the read-write mode allows the information handling system to read and write data from the device via the interface; and
   if the device is determined to not support configuration to operate in a read-only mode or not to meet the predetermined security level, preventing the information handling system from transmitting data to and receiving data from the device via the interface.

2. The system of claim 1, wherein the step of determining comprises:
   receiving an authentication parameter of the device via a configuration channel (CC) sideband of the interface; and
   verifying the authentication parameter of the device indicates that the device meets the predetermined security level.

3. The system of claim 2, wherein the step of connecting comprises configuring the device to operate in the read-only mode via the CC sideband.

4. The system of claim 2, wherein the step of verifying is performed by the BIOS of the information handling system.

5. The system of claim 1, wherein the interface is a Universal Serial Bus (USB) Type-C interface, wherein configuring the interface to operate in the read-only mode comprises configuring the interface to operate in a Type-C Alternate Mode, and wherein the controller is further configured to operate the interface in the Type-C Alternate Mode while the information handling system is connected to the device.

6. The system of claim 1, wherein the step of preventing comprises:
   powering down the interface; and
   displaying a message to a user of the information handling system informing the user that the device is not a secure device.

7. The system of claim 1, further comprising an embedded controller, wherein the embedded controller is configured to control data transmitted via the interface with one or more General Purpose Input/Output (GPIO) pins of the embedded controller.

8. A method comprising:
   determining whether a device coupled to the interface supports configuration to operate in a read-only mode;
   if the device is determined to support a configuration to operate in a read-only mode, connecting the information handling system to the device in the read-only mode, wherein connecting comprises configuring both the interface and the device to operate in the read-only mode, and wherein the read-only mode allows the information handling system to read data from the device via the interface but prevents data, apart from non-user data, from being written to the device;
   determining whether a device coupled to the interface meets a predetermined security level, wherein the predetermined security level is specified in a Basic Input/Output System (BIOS) and determining comprises verifying an authentication parameter;
   if the device is determined to support a configuration to operate in a read-only mode and meets the predetermined security level, connecting the information handling system to the device in the read-write mode, wherein connecting comprises configuring both the interface and the device to operate in the read-write mode, and wherein the read-write mode allows the information handling system to read and write data from the device via the interface; and
   if the device is determined to not support configuration to operate in a read-only mode or not to meet the predetermined security level, preventing the information handling system from transmitting data to and receiving data from the device via the interface.

9. The method of claim 8, wherein the step of determining comprises:
   receiving an authentication parameter of the device via a configuration channel (CC) sideband of the interface; and verifying the authentication parameter of the device indicates that the device meets the predetermined security level.

10. The method of claim 9, wherein the step of connecting comprises configuring the device to operate in the read-only mode via the CC sideband.

11. The method of claim 8, wherein the interface is a Universal Serial Bus (USB) Type-C interface, wherein configuring the interface to operate in the read-only mode comprises configuring the interface to operate in a Type-C Alternate Mode, and wherein the controller is further configured to operate the interface in the Type-C Alternate Mode when the information handling system is connected to the device.

12. The method of claim 8, wherein the step of preventing comprises:
   powering down the interface; and
   displaying a message to a user of the information handling system informing the user that the device is not a secure device.

13. The method of claim 8 further comprising controlling data transmitted via the interface with one or more General Purpose Input/Output (GPIO) pins of an embedded controller of the information handling system.

* * * * *